Aug. 22, 1950    R. O. BULLARD ET AL    2,519,882
CONSTANT TORQUE DEVICE
Filed April 30, 1948
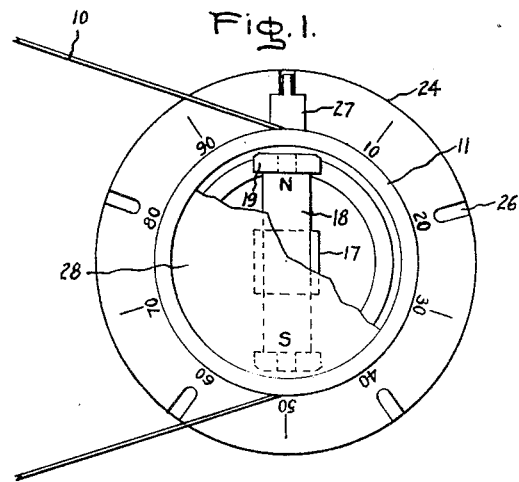
Fig. 1.
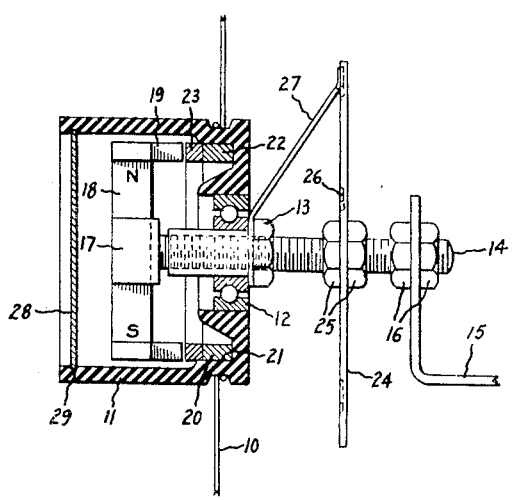
Fig. 2.
Fig. 3.
Inventors:
Robert O. Bullard,
Rollin J. Parker,
by Prowell P Mack
Their Attorney.

Patented Aug. 22, 1950

2,519,882

UNITED STATES PATENT OFFICE 2,519,882

CONSTANT TORQUE DEVICE

Robert O. Bullard and Rollin J. Parker, Schenectady, N. Y., assignors to General Electric Company, a corporation of New York Application April 30, 1948, Serial No. 24,133

3 Claims. (Cl. 172—285)

Our invention relates to a constant torque device and more particularly to a device adapted to place a manually adjustable constant tension on a moving filament in frictional contact with a rotatable wheel or drum of the device.

The device is useful in weaving or other textile applications as it will reduce the likelihood of breakage of thread or yarn. The device will also be found useful in wire drawing applications where there are speed variations with consequent torque variations such as those caused, for example, by attempts to compensate for "build up" on a spool or reel.

It is an object of the present invention to provide a device which will impose on a filament a torque which is constant and essentially independent of speed.

Broadly, the means employed in the embodiment herein illustrated and described comprises a stationary inner shaft member, a bar magnet secured to said shaft, a hysteresis ring member arranged to be rotatable around the shaft and separated from the bar magnet by an air gap, and an outer case which rotates the hysteresis ring and acts as a pulley for a wire or thread on which it is desired to place constant tension. By moving the rotatable housing and hysteresis ring (with respect to the shaft and bar magnet) the air gap between the magnetic members may be varied and the torque of the device adjusted.

Further objects and advantages will become apparent and our invention will be better understood from consideration of the following description taken in connection with the accompanying drawing in which Fig. 1 is a front elevation of a device suitably embodying our invention, Fig. 2 is a side elevational view mostly in section of the device shown in Fig. 1, and Fig. 3 is an end view of one of the pole pieces 19 shown in Figs. 1 and 2.

Referring now to Figs. 1 and 2, a filament 10, of thread such as that used in a textile application, is wound around a circumferential groove of the device housing member 11 so that movement of filament 10 will cause the housing to rotate. The housing 11 is pressed over the outer race of a ball bearing member 12, the inner race of which is pressed over a sleeve nut 13. The sleeve nut 13 is internally threaded and arranged to cooperate with the threads of a stationary shaft or stud member 14. Stud 14 is held stationary by a mounting bracket 15 bolted on the stud by means of nuts 16. The stud 14 terminates at one end in an outwardly extending channel or yoke portion 17 which is adapted to receive a bar magnet 18 which is permanently secured within the channel, as by brazing. The bar magnet is permanently magnetized to form radial north and south poles as indicated by the letters "N" and "S" on the drawing. It will be understood by those skilled in the art that this bar magnet is preferably of a high energy or a "permanent" ferromagnetic material. Tapered pole pieces 19 (Fig. 3) are affixed to the ends of the bar magnet and designed to direct flux from the poles axially inward and concentrate it at the tapered pole piece tips. This magnetic member (i. e., the bar magnet and pole pieces) is adapted to cooperate with a hysteresis ring 20 which is pressed within an inner periphery 21 of the housing 11 so as to be rotatable therewith. The hysteresis ring comprises a back-up flux return portion 22 (which may conveniently be of sintered iron) and a face portion 23 of a magnetic material characterized by a high hysteresis characteristic or, in other words, a large energy loss associated with its magnetization and demagnetization, such as, for example, an aluminum-nickel-cobalt-iron alloy. If desired the flux return portion and the face portion of high loss alloy may be pressed and sintered as an integral unit.

An important feature of the invention as shown is the fact that the sleeve nut 13, (and consequently the bearing, housing and hysteresis ring assembly) may be moved axially along the stud 14 to vary the air gap between the hysteresis face portion 23 and the pole pieces 19 so that the torque developed by the device may be adjusted as found necessary to make the device applicable for various applications or materials. To provide both locking and indicating means, a circular dial 24 is affixed on the stud as by means of nuts 25. The dial is provided with calibrated grooves, or dimples, 26. A pointer 27 of spring steel is securely fastened at its inner end to the sleeve nut 13 and adapted at its outer end to selectively engage the calibrated grooves.

To prevent the entrance of lint or other foreign matter into the interior of the device, the open end of the housing 11 may be sealed off by a diaphragm 28 of flexible material so that it can be inserted to be held in a slot 29 provided in an inner periphery of the housing. If desired, the diaphragm 28 and the housing 11 may be made of transparent material so that the operation of the device can be observed. It is desirable that the outer housing 11 be a non-conductor since, otherwise, eddy currents would be set up in this member. Such eddy currents would vary with speed and, therefore, tend to defeat the constant torque principle of the device.

As known to the art, use of a suitable aluminum-nickel-cobalt-iron alloy for a hysteresis member will insure that a relatively large amount of energy will be required to bring a relatively small amount of the material through its hysteresis cycle. It will be understood that, in operation, the hysteresis ring 20 revolves with the case while the bar magnet 18 remains stationary. The bar magnet carries the complete volume of the ring face material through its hysteresis loop during one complete rotation of the ring. Since the hysteresis loop area is independent of frequency, the work done and, consequently, the torque developed is independent of speed. By directing the threaded sleeve 13 along the threaded stud 14, the entire case is moved axially with respect to the bar magnet to change the gap between ring and bar and, consequently, the torque developed.

While we have shown and described particular embodiments of our invention, modifications thereof will occur to those skilled in the art. We desire it to be understood, therefore, that our invention is not to be limited to the particular arrangement described, and we intend in the appended claims to cover all modifications which do not depart from the true spirit and scope of our invention.

What we claim as new and desire to secure by Letters Patent of the United States is:

1. An adjustable constant torque device comprising an externally threaded inner shaft member, means including a bracket adapted to hold said shaft in a stationary position, a permanently magnetized bar member secured to said shaft, pole pieces of magnetic material affixed to the ends of said bar magnet and extending axially of said shaft member, a ring of permanent magnet material arranged to rotate around said shaft member axially adjacent said pole pieces, and adjustable means interposed between said rotatable magnetic member and said shaft for varying the axial air gap between said magnet pole pieces and said ring.

2. An adjustable constant torque device comprising an externally threaded stationary shaft member, a bar magnet member affixed to an end of said shaft and having two radial poles of opposite polarity, pole pieces attached to said bar magnet and adapted to direct flux axially inward from said poles, a sleeve nut on said stud, an anti-friction bearing pressed on said sleeve nut, an outer housing of non-conductive material attached to the outer periphery of said bearing and having an outer circumferential groove, a hysteresis ring member pressed in said housing and having a flux return portion of iron and a face portion of an alloy characterized by an appreciable energy loss associated with its magnetization and demagnetization, said face portion being adjacent the tips of said pole pieces and normally separated therefrom by an axial gap adjustable by turning the assembly of said sleeve nut, bearing, housing and hysteresis ring member on said threaded shaft, means for locking said sleeve nut with respect to said shaft, and means for indicating the width of said air gap.

3. In an adjustable torque pulley adapted to be engaged by an elongated moving filament, an externally threaded stud terminating in an axially outward extending channel portion, a stationary support bracket fastened to said stud at the opposite end thereof from said channel shaped portion, a sleeve nut on said stud and interposed between said channel portion and said support bracket and having internal threads cooperating with the threads of said stud whereby turning said sleeve nut will adjust its position axially along said stud, a ball bearing assembly pressed over said sleeve nut, an outer housing of transparent material pressed over said ball bearing and having an outer circumferential groove adapting said housing to act as a pulley for said filament, said housing having an intermediate inner periphery, an annular hysteresis ring member pressed in said intermediate inner periphery to be rotatable with said housing, said hysteresis ring member comprising a face portion of aluminum-nickel-cobalt-iron alloy having a large hysteresis loss characteristic and said hysteresis ring member comprising a back-up magnetic keeper of sintered iron providing a flux return for said face portion, a rotatably extending bar magnet fastened within the yoke of said stud channel portion and comprising a magnetic material of low permeability permanently magnetized with opposite poles at the respective radial ends, tapered pole pieces of high permeability magnetic material affixed to said poles and adapted to concentrate and direct magnetic flux axially toward said hysteresis ring face portion, a circular dial affixed to said stud between said housing and said support bracket and having calibrated dial grooves therein, a pointer of spring steel having its radially inner end affixed to be rotatable with said sleeve nut and its radially outer end adapted to selectively engage said calibrated dial grooves, whereby adjustment of said pointer from one to the other of said calibrated grooves will vary the axial gap between said hysteresis ring face portion and said pole pieces.

ROBERT O. BULLARD.
ROLLIN J. PARKER.

REFERENCES CITED

The following references are of record in the file of this patent:

UNITED STATES PATENTS

| Number | Name | Date |
|---|---|---|
| 775,549 | Alexander et al. | Nov. 22, 1904 |
| 1,424,769 | Morrison | Aug. 8, 1922 |
| 1,862,267 | Honig | June 7, 1932 |
| 1,887,284 | Brady | Nov. 8, 1932 |
| 1,977,600 | Winther | Oct. 16, 1934 |
| 2,183,404 | Morrill | Dec. 12, 1939 |
| 2,241,983 | Connolly | May 13, 1941 |
| 2,361,239 | Ransom | Oct. 24, 1944 |
| 2,373,609 | Stahl | Apr. 10, 1945 |
| 2,386,505 | Puchy | Oct. 9, 1945 |